United States Patent [19]
Cameron

[11] Patent Number: 5,633,163
[45] Date of Patent: May 27, 1997

[54] METHOD FOR TREATING WASTEWATER AND SOLID ORGANIC WASTE

[75] Inventor: Dean O. Cameron, Maleny, Australia

[73] Assignee: Dowmus Pty Ltd, Nambour, Australia

[21] Appl. No.: 403,756

[22] PCT Filed: Sep. 13, 1993

[86] PCT No.: PCT/AU93/00470

§ 371 Date: Mar. 8, 1995

§ 102(e) Date: Mar. 8, 1995

[87] PCT Pub. No.: WO94/06734

PCT Pub. Date: Mar. 31, 1994

[30] Foreign Application Priority Data

Sep. 14, 1992 [AU] Australia ................. PL4705

[51] Int. Cl.$^6$ .............................. B01J 8/00; C05F 17/00
[52] U.S. Cl. .............................. 435/262; 71/12; 210/617; 422/184.1
[58] Field of Search .................. 435/262, 313; 210/617, 615, 620, 150; 71/12, 14; 422/232, 239, 184.1, 217, 219, 187

[56] References Cited

U.S. PATENT DOCUMENTS

| | | |
|---|---|---|
| 3,136,608 | 6/1964 | Lindström . |
| 3,960,718 | 6/1976 | Lebo . |
| 4,196,082 | 4/1980 | Salokangas et al. . |
| 4,213,864 | 7/1980 | Asikainen . |
| 4,249,929 | 2/1981 | Kneer . |
| 4,272,489 | 6/1981 | Lutz et al. . |
| 4,302,236 | 11/1981 | Roman . |
| 4,608,175 | 8/1986 | Nuttle . |
| 4,627,116 | 12/1986 | Shimizu . |
| 4,744,903 | 5/1988 | McAninch et al. . |
| 4,761,235 | 8/1988 | Haentjens . |
| 4,997,568 | 3/1991 | Vandervelde et al. . |
| 5,171,690 | 12/1992 | Ylösjoki . |

FOREIGN PATENT DOCUMENTS

| | | |
|---|---|---|
| 5288 | 5/1961 | Australia . |
| 1483976 | 6/1976 | Australia . |
| 3932378 | 8/1978 | Australia . |
| 4103389 | 3/1991 | Australia . |
| 3462189 | 4/1992 | Australia . |
| 4934690 | 5/1992 | Australia . |
| 41321 | 6/1993 | Australia . |
| 1332081 | 9/1994 | Canada . |
| 0485358 | 5/1992 | European Pat. Off. . |
| 0542162 | 5/1993 | European Pat. Off. . |
| 4002174 | 4/1991 | Germany . |
| 3934122 | 4/1991 | Germany . |
| 4113993 | 12/1991 | Germany . |
| 57-81884 | 5/1982 | Japan . |
| 57-135093 | 8/1982 | Japan . |

(List continued on next page.)

OTHER PUBLICATIONS

Perry et al (eds). Chemical Engineers Handbook. 5th ed. New York, McGraw–Hill, 1973, p. 7–4. 1973.

*Primary Examiner*—George Yeung
*Attorney, Agent, or Firm*—Dvorak and Traub

[57] ABSTRACT

Organic waste disposal treatment apparatus includes a treatment chamber assembly in which a compost bed may be formed, an inlet to the treatment chamber assembly through which organic waste may be added to a compost bed in the treatment chamber assembly, ventilation means for promoting aerobic digestion of the compost bed in the treatment chamber assembly, drainage means for preventing waste material in the treatment chamber assembly from becoming anaerobic and access means for accessing and removal of compost formed in the treatment chamber assembly. The treatment chamber assembly includes a holding tank formed of plastics material, the access means includes a closed conveyor for conveying compost from the lower zone of the compost bed. The treatment chamber assembly may include an air permeable division for diving a duct from the compost bed. It is also preferred that the holding tank be partially filled with an active bed of compost.

8 Claims, 3 Drawing Sheets

FOREIGN PATENT DOCUMENTS

| | | |
|---|---|---|
| 57-147491 | 9/1982 | Japan . |
| 59379 | 1/1984 | Japan . |
| 60-18565 | 1/1985 | Japan . |
| 62-162684 | 7/1987 | Japan . |
| 1104397 | 4/1989 | Japan . |
| 8501715 | 1/1987 | Netherlands . |
| 128957 | 5/1974 | Norway . |
| 8402334 | 6/1984 | WIPO . |
| 9110631 | 7/1991 | WIPO . |
| 9210444 | 6/1992 | WIPO . |
| 9310060 | 5/1993 | WIPO . |
| 9316018 | 8/1993 | WIPO . |

METHOD FOR TREATING WASTEWATER AND SOLID ORGANIC WASTE

CROSS REFERENCES TO RELATED APPLICATIONS

This application claims priority from its PCT parent application PCT/AU93/00470, filed on Sep. 13, 1993.

BACKGROUND OF THE INVENTION

1. Field of the Invention

This invention relates to a method of and apparatus for disposal and treatment of waste.

2. Description of the Related Art

This invention has particular but not exclusive application to the production of compost from domestic organic waste using a composting toilet, and for illustrative purposes, reference will be made to such an application. However, it is to be understood that this invention could be used in other applications such as production of compost and/or disposal of waste in industrial, commercial and other situations. Compost material may be defined as waste material that has become stable through biological action. Composting is performed in a compost bed which may be defined as a bed of composting and composted organic solid wastes, the composted material being completely decomposed organic matter and the composting material being material including raw organic wastes and decomposing organic material.

Organic wastes can be classified into two general forms. Solid wastes such as paper, cellulose based products, food wastes and yard wastes, can be defined as Organic Municipal Solid Wastes (OMSW). Liquid organic wastes, such as sullage water and sewage water, can be defined as Wastewater. Unless the context dictates otherwise, wastewater hereinafter may be taken to have this meaning.

Current waste treatment technologies are, with the exception of large scale methane digestion, based on separate treatment processes for the high solids OMSW and low solids wastewater. Typically the solids component of wastewater is separated from the water during anaerobic fermentation by sedimentation of the solids as a sludge which is then de-watered and is commonly composted with an organic bulking agent such as wood waste, or co-composted with OMSW.

In the past land disposal of the sludge mixed with lime to partially sanitise was common. Supernatant liquid formed as a result of the settling out of the solids from the wastewater in the primary treatment process is referred to as primary effluent which, without further, secondary treatment, is not safe to discharge into the general environment. A process to further treat the wastewater relying on aeration of the primary treated effluent in the presence of aerobic organisms, which utilise degradable organic matter and bacteria in the effluent; as food sources, and so purify the wastewater and reduce its environmental hazard has been developed and commercialised.

Further settling of sludge occurs in a secondary treatment vessel, designed to maximise the biological breakdown of suspended and dissolved organic matter, by a fixed or mobile biofilm of aerobic microbes. The primary effluent entering the secondary treatment vessel is aerated by blowing air over or through a large liquid contact surface to assist in and support the growth of the aerobic biofilm. After secondary treatment, the effluent is usually disinfected and discharged.

Such conventional methods of wastewater treatment have several disadvantages. The usual scale of treatment is at the municipal scale, where the process is reliant on high energy inputs for pumping, aeration, and construction of specialised apparatus for process control, monitoring, and materials handling, management and staffing inputs are high and a costly and complicated transport and treatment infrastructure is essential.

The municipal treatment of OMSW is similarly expensive and troublesome. Regulations are being formulated in many countries which prohibit OMSW disposal in landfill. Composting, though the most favoured method of treatment, is not without problems. Odour problems have caused some compost plant operators to enclose the operation so that odorous air may be filtered through a bio-filtration apparatus and/or odour scrubbers prior to discharge of the spent air.

This problem, coupled with high levels of contaminants if industrial wastes are combined with domestic wastewater, have caused some sewage plant operators to opt for incineration as a more convenient path despite the large amounts of energy required for drying before combustion.

Co-composting can often reduce the amount of municipal solid waste going to landfill by as much as 60%, representing a significant saving. Where co-composting of sewage sludge and OMSW is practiced, it is still expensive, due to the need to collect, sort, transport and process the organic portion before composting.

A large proportion of the cost associated with sewage sludge when centralised is attributed to establishing and maintaining systems for the collection and transport of the wastes, and transport of sewage sludge is the major cost involved. Wherever sewage sludge is incorporated, there can be consumer resistance to the product because of perceived health risks from biological and/or industrial contaminants.

On-site household wastewater treatment systems can, with proper maintenance, recycle water for gardens, whilst various household composting devices are being employed to recycle nutrients and humus back into the soil. The risk of spreading waterborne diseases should be lessened, but only where contact with wastewater is restricted to those likely to have developed immunity to any diseases contained in the wastewater.

On a household scale, on-site wastewater treatment is not preferred over centralised treatment, partly because of its inconsistent performance, and the requirement for ongoing monitoring of each installation. The anaerobic digestion stage is prone to the formation of bacterial scums and crusting which can lead to odour and performance problems.

Present household wastewater treatment systems, need indefinite, specialised and costly management intervention, are sensitive to common household chemicals and require ongoing costly maintenance. At the household scale chlorine based disinfection is typically carried out on the liquid effluent, using hazardous chemicals and resulting in the production of toxic disinfection by-products. Additionally, on-site composting has the inconvenience the potential for vermin and disease vectors to gain access to such composting apparatus and require sorting and user management intervention to produce good compost.

SUMMARY OF THE INVENTION

This invention aims to alleviate the above disadvantages and provide a method and apparatus for the disposal and treatment of waste which will be reliable and efficient in use.

With the foregoing in view, this invention in one aspect resides broadly in organic waste disposal treatment apparatus including:

a treatment chamber assembly in which a compost bed may be formed;

inlet means to the treatment chamber assembly through which organic waste may be added to a compost bed in the treatment chamber assembly;

ventilation means for promoting aerobic digestion of a compost bed in the treatment chamber assembly;

drainage means for preventing waste material in the treatment chamber assembly from becoming anaerobic, and access means for accessing and removal of compost formed in the treatment chamber assembly.

The treatment chamber assembly may be formed as a transportable assembly and include a holding tank formed of plastics material, concrete or metal and which may be installed below ground or above ground. The treatment chamber assembly may also be formed in-situ and include an unlined pit excavated into stable soil. Alternatively the treatment chamber assembly may be formed in-situ as a concrete or plastics lined below ground tank.

The access means may be a port through which compost may be removed, removal being accomplished in any desired manner. Alternatively the access means may be an enclosed pathway extending upwardly from the base of the compost bed at the exterior of the treatment chamber assembly and which is filled through action of organisms. Preferably however the access means includes a closed conveyor for conveying compost from the lower zone of the compost bed.

The drainage means may be a liquid outlet from which treated liquid waste material drains gravitationally from the treatment chamber. Other forms of drainage means such as bailing means or pumping means may be used to prevent excess accumulation of water in the lower part of the compost bed as would promote anaerobic digestion of the waste material.

If desired conveyor means may be used to transport the waste material from the inlet to the access means. The conveyor means may be a belt conveyor or elevator. Preferably however the arrangement of the treatment chamber assembly is such that in use, organic waste material introduced into treatment chamber will flow gravitationally towards the access means.

In one embodiment, a holding zone forms in use where substantially no further decomposition of solid waste material occurs, and the holding zone results from the configuration of the treatment chamber assembly whereby, in use, inactive material will accumulate beside and/or beneath the active compost bed. The inactive material may provide an alternative habitat for organisms in the compost bed should temperature conditions therein become elevated. In another embodiment the compost bed is transported as plug flow through the treatment chamber assembly towards the access means which is adapted to provide discharge of compost from the base of the compost bed. In this embodiment it is preferred that the treatment chamber assembly include waste water input means whereby a controlled flow of waste water is added over the upper surface of the compost bed. The waste water assists in oxygenating the compost bed, in maintaining the temperature within the compost bed within desirable limits. Metering means may be provided for preventing excess flow of waste water onto the compost bed.

The ventilation means may be an induced or natural ventilation of the compost bed. Preferably the ventilation means introduces air or oxygen into the treatment chamber assembly beneath or into the compost bed to facilitate aeration of the waste material. The ventilation means may include a spiral shelf extending around the compost bed and shielding a spiral chamber through which an air flow may be induced to ventilate the compost bed.

The treatment chamber assembly may include air permeable division means for dividing an air chamber or duct from the compost bed. The division means may be water permeable and divide a bottom portion of the treatment chamber assembly from the compost bed whereby air may be diffused into the compost bed from the bottom portion and water may be drained therethrough from the compost bed. The division means may be constituted by an air duct having an intermediated portion supported on and/or above the base wall of the treatment chamber and through which air may be introduced into the treatment chamber. The intermediate portion may be coiled about the base wall of the treatment chamber and may be imbedded in a permeable substrate such as charcoal. The intermediate portion is slotted or perforated or the like so as to ventilate the compost bed. Suitably the duct is constituted by flexible plastics agricultural pipe which is apertured for drainage. A length of such agricultural pipe may extend from an above ground inlet through the treatment chamber to an elevated weather cocked outlet and an air pump may be arranged in the pipe or in-line with the pipe to create a forced air flow into the treatment chamber and through the pipe.

The inlet means may be constituted by or include the outlet from one or more water closets. The inlet means may be constituted by or include a dry toilet, preferably located centrally above the treatment chamber assembly.

It is also preferred that the holding tank be partially filled with an active bed of compost. This may be provided with the apparatus, added separately after installation of the apparatus, or it may be formed during the initial use of the waste treatment apparatus by following a selected initialising use procedure.

In a further aspect this invention resides broadly in a method of treating organic waste including:

forming and maintaining an aerobic compost bed;

feeding solid organic waste and wastewater onto the compost bed;

causing excess wastewater to filter through the compost bed;

removing filtered wastewater to prevent anaerobic conditions developing in the compost bed, and removing composted waste material from said compost bed.

The method may be carried out as a batch process in open treatment areas. Preferably however the process is carried out in a closed waste treatment apparatus and forced ventilation of the closed waste treatment apparatus is utilised to output collected gases remote therefrom. It is also preferred that the ventilation be utilised to assist in maintenance of aerobic conditions within the compost bed.

Suitably the compost bed is formed in a chamber whereby introduced wastewater is confined to flow through the compost bed. In such arrangement the filtered wastewater may be removed by drain means from the base of the chamber. Preferably the method is carried out in treatment apparatus as defined above.

In a further aspect, this invention resides broadly in a wastewater purification process including:

maintaining an aerated compost bed, and causing the wastewater to infiltrate into and percolate through the aerated compost bed. The wastewater may be pulsed or metered continuously onto the surface of the compost bed. Preferably the wastewater application pattern is selected so as to enhance the rate of decomposition of organic material supplied to the compost bed. It is also preferred that the lowermost layer of composted solid organic waste material is periodically removed, permitting continuous addition of fresh organic wastes to the surface of the compost bed.

The wastewater purified by a single pass through a compost bed as described above may be further purified by a passing it through a bed of aerated media through which air or ozonated air is drawn. The aerated media may be disposed at the base of the compost bed or it may be disposed remote from the compost bed. Suitably the ozone source is attached to or suspended within a duct leading to a perforated or air porous duct or ducts in the base of the chamber supporting the compost bed and encompassed within a suitable air porous media whereby ozonated air may be dispersed through an air porous media to effect disinfection and clarification of the effluent percolating through the air porous media.

Suitably the conditions within the compost bed are maintained such that wastewater passing therethrough is purified through biological and physical/chemical processes.

The wastewater may be spread over the surface of the compost bed via a surge control device. The latter may be provided with an overflow bypass and an irrigation/dispersal system incorporated into or attached to the surge control device.

If desired a heat exchange coil may be located in the base of a the compost bed which is suitably housed in an insulated container such that heat contained in the effluent may be recovered for useful purposes.

BRIEF DESCRIPTION OF THE DRAWINGS

In order that the invention may be more readily understood and put into practical effect, reference will now be made to the accompanying drawings which illustrate preferred and/or typical embodiments and wherein.

DETAILED DESCRIPTION OF THE PREFERRED EMBODIMENT

Figure 1:
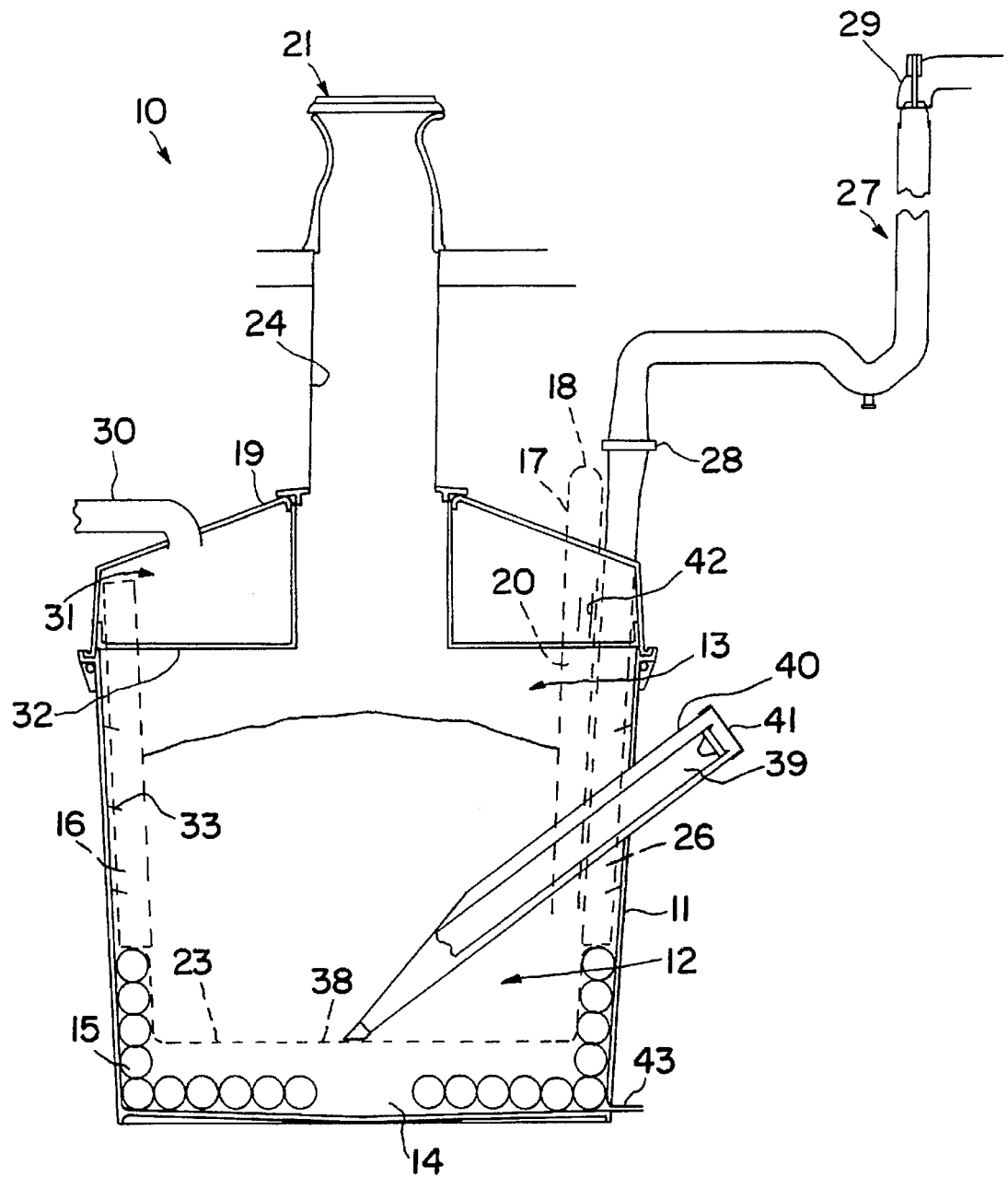
FIG. 1 is a schematic cross section of a composting apparatus with a toilet pedestal according to a preferred embodiment of the invention.
Figure 2:
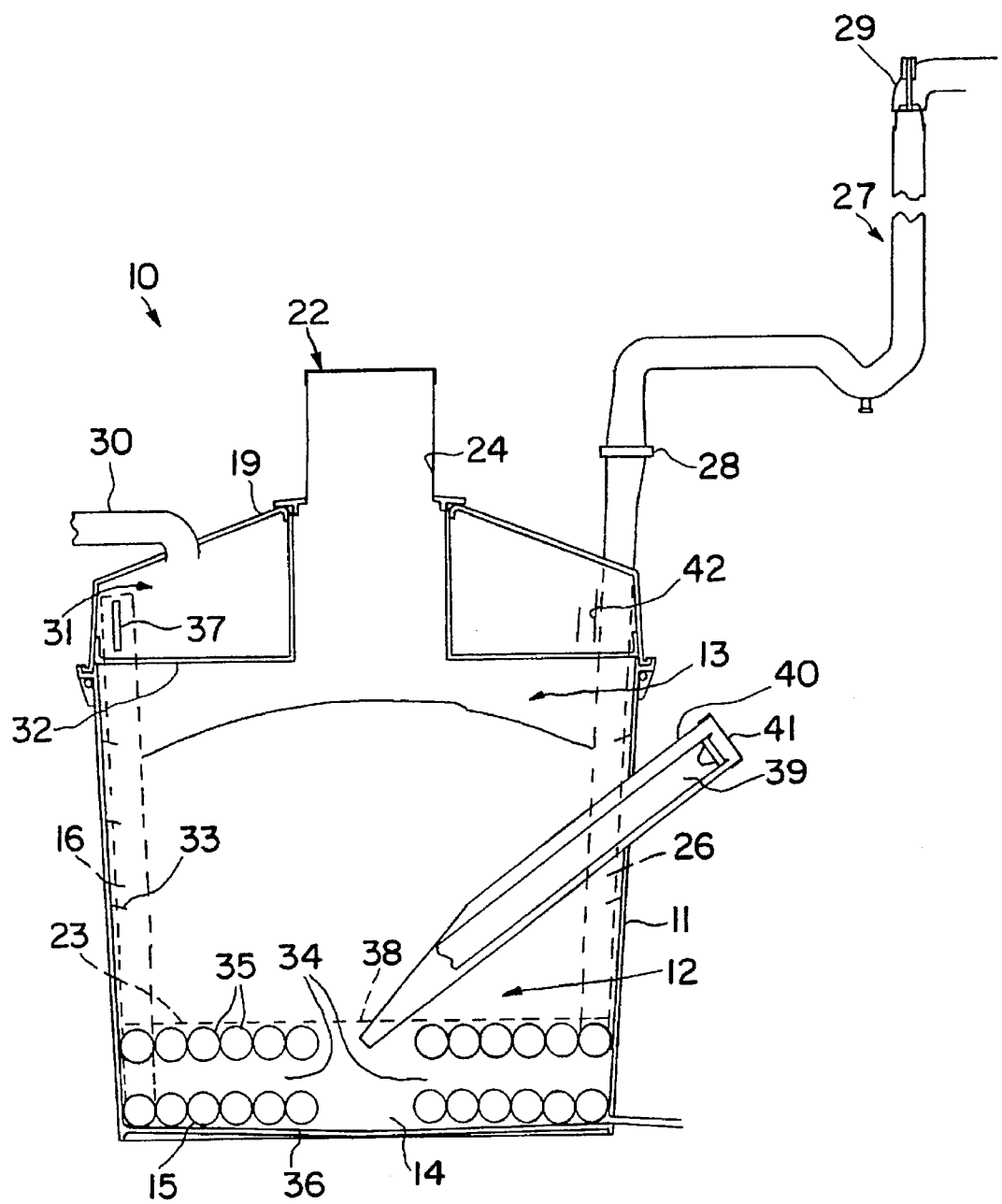
FIG. 2 is a schematic cross section of a composting apparatus with a compost input chute according to a preferred embodiment of the invention.
Figure 3:
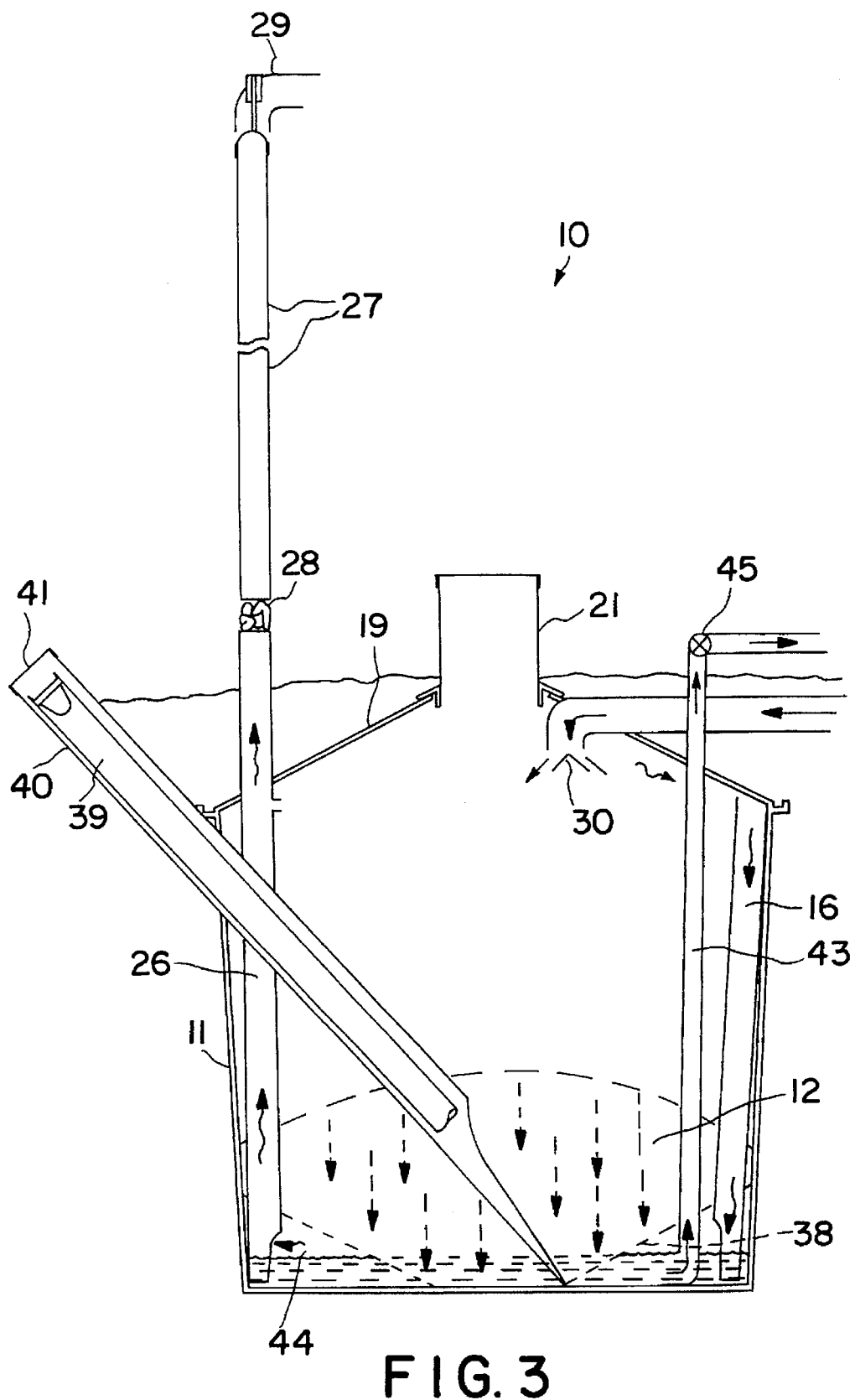
FIG. 3 is a schematic cross section of a composting toilet alternative to the embodiment of FIG. 1

Referring to FIGS. 1, 2 and 3, a waste treatment apparatus 10 includes a compost reactor vessel 11 constructed of polyolefin plastic. The dimensions of the reactor vessel 11 are such that sufficient surface area is available to achieve a decomposition rate equal to the solid waste deposition rate. This has been found to be approximately 0.4 m$^2$ per equivalent person (EP) contributing to the system. The depth of the reactor vessel 11 should be sufficient to allow a compost bed 12 of at least 1.5 m to develop and still allow an air space 13 above the compost. For an average household, the reactor vessel 11 is 1.8 m in diameter and 1.9 m in height is generally adequate.

The reactor vessel 11 is partially filled, with an active bed of compost 12. A minimum depth of 600 mm of stable compost is provided as a compost bed 12 which is supported by a structurally adequate drainage medium 14 preferably with a high surface area capable of supporting a growth of biofilm.

A drainage system 15, preferably of perforated flexible plastic ducting with a corrugated annular wall profile such as agricultural pipe or tubing is coiled about the bottom of the reactor vessel 11 and leading to a drain 43.

Alternatively, a collection sump is formed in the base of the medium 14.

Air is drawn over the compost bed 12, down an internal vent duct 16 and under the compost bed 12 through the drainage system 15 such that the compost bed 12 and drainage system 15 are maintained with sufficient oxygen to substantially maintain aerobic conditions. The oxygen provided also aerates the wastewater passing through the drainage system 15 to increase the oxygen concentration prior to discharge from the reactor vessel 11.

Predatory beetles and earwigs and such like may be introduced to control fly larvae, and an insect trap 17 is incorporated into the reactor vessel 11 using the phenomenon that most flying insects are attracted to light. One or several lengths of tube, with a light source 18, preferably daylight via a transparent UV stable plastic dome at the upper end extend through a lid 19 to the reactor vessel 11 and into the compost bed 12.

A light transmitting funnel shaped insert 20 projects into each insect trap 17 beneath the underside of the lid 19. The trapped insects die and fall into the compost bed 12 and decompose, thus alleviating intrusion of flying insects into a household if a waterless toilet pedestal 21 as shown in FIG. 1 or compost hatch 22 as shown in FIGS. 2 and 3 is incorporated therein.

The solids flow pattern is essentially a natural fall of material by gravity with fresh wastes added to the top surface of the compost bed 12 and the stable fully decomposed humic material accumulating at the base 23 of the compost bed 12 which functions as a biological wastewater filtration medium. Because of the behaviour of the worms and insects, there is some mixing of the lower material by deposition of frass, worm castings, exfoliation and/or cast off animal skins or casings onto the surface.

Preferably after the compost depth has built up to provide a sufficient depth of stable filtration medium, the finished compost is removed periodically from the central region of the base to maintain the compost bed profile at about 1.5 meters deep.

In municipal scale treatment systems, sewage sludge could be added to the system by conveyors and/or spreaders. In a domestic situation a waste entry chute can be provided by the pedestal 21 or the hatch 22 where a water flush toilet is used to input toilet wastes.

In both cases the waste is input directly and substantially centrally above the reactor vessel 11 so that wastes may drop under gravity onto the compost bed 12. A connecting chute 24 is blackened internally to minimise light reflection and serves as the air intake duct for the ventilation system to alleviate unwanted toilet room odours where the waterless toilet pedestal 21 is used. The connecting chute 24 may be unscreened since no odour trail is detectable to flies and other vermin which are attracted to the odour of decaying organic matter. Thus the waterless toilet pedestal 21 may be used without the need to seal or screen the toilet opening to prevent the entry of flying insects.

Air is drawn into the drainage system 15 below the compost bed 12 via the vent duct 16 which passes through the compost bed 12 and connects to the drainage system 15. If disinfection via ozonation is not required, an internal exhaust duct 26, connects to the other end of the drainage system 15 and passes up through the compost bed 12 and out through the lid 19.

A fan 28 is preferably connected to the top of the exhaust duct 26. Where no electricity is available a wind, passive solar and/or compost heated air convection system may be used to generate the required air flow. Exhaust air may be discharged via a vent stack 27 and wind vane venturi diffuser 29 to dissipate any diluted residual odours along with the carbon dioxide enriched air.

Wastewater is preferably led, from one or more flush toilet pedestals and/or sullage drains by a gravity drainage plumbing system 30, directly to a surge tank 31 with a flow control device 32, constituted by a perforated sheet, which permits wastewater to be pulsed onto the compost bed 12 over an extended period of time and spread more evenly over the composting bed 12. Wastewater application rates and distribution, should be such that surface ponding and short-circuiting of wastewater is avoided. An overflow by-pass 42 is provided for excessive amounts of liquid input.

A series of flow barriers 33 projecting into the compost bed 12 may be installed on the vessel side walls to prevent side wall short circuiting flow from reducing the effluent quality produced at high wastewater application rates. The wastewater treatment apparatus 10 does away with grease traps, since, during normal domestic usage any fats, grease or waxes are broken down within the compost.

In use, a range of beneficial composting organisms are introduced to inoculate or "seed" the compost bed 12, including composting worms, composting beetles, compost flies and such like typical of a soil litter layer or decomposing manure. The larger organisms work synergistically with fungi, bacteria, protozoa, nematodes and other microbes, (which are ubiquitous in such habitats), to effect the complete decomposition of all solid organic wastes as deposited onto the compost bed to effect rapid and near odourless decomposition of the total organic waste stream.

The worms and insects mix and turn the waste material, keeping it open and exposed to aeration internally, and so preventing it from becoming sour or putrid. The comminuting mouthparts and the anatomy of the gut of such organisms greatly expand the surface area of the organic waste material exposed to digestion and microbial decomposition. Wetting of the waste paper and cardboard and other cellulose fibre wastes with the wastewater, weakens the materials and permits them to be broken up more easily and ingested. Insects can have a beneficial effect on treatment performance of the apparatus of this invention, but may be a nuisance if not controlled.

Experimental observations of the effluent treatment performance in on-site household treatment systems have shown that effluent with a biological oxygen demand over five days of less than 10 mg/l and suspended solids of 20 mg/l can be consistently expected and that the performance of the composting bed wastewater treatment system improves over time as the depth of fine stable compost increases. Additionally, experiments have shown that bleaches, detergents, fats and waxes, do not adversely affect the composting organisms, possibly because of the large proportion of organic carbon available to bind potentially toxic substances and inactivate or adsorb them.

Depending on the type of reuse proposed for the effluent, disinfection may be required. Disinfection could be by soil irrigation, slow sand biofiltration, artificial wetland treatment, ozonation, membrane filtration, UV radiation, chlorination or any other established technology deemed appropriate to achieve the standard of effluent required. If disinfection to body contact standard is required, sand or preferably crushed charcoal of a similar aggregate size, aerated with ozonated air could be incorporated into the base of the compost bed reaction vessel and so provide a simple, compact, and complete waste treatment system.

Referring in particular to FIG. 2, a convenient and cost effective means of creating an ozone disinfection filter in the base of the compost bed reactor vessel is to sandwich a layer of porous disinfection filter medium 34 between two unconnected tightly spiralled coils of annular fluted perforated plastic drainage pipe forming the drainage system 15. A negative pressure is applied to the upper coil 35 by the fan 28 in the exhaust ducting 26 such that ozonated air, produced by an ozone generator 37 in the vent duct 16 is drawn into a lower coil 36 and then through the disinfection medium 34 allowing ozonation of the effluent film covering the medium surfaces.

Oxygen in the air, and oxygen formed after the reaction of the ozone with effluent contaminants, supports a biofilm of beneficial organisms to consume any organic matter made degradable through ozonation. A geotextile fibre filter matting 38 resistant to breakdown may be placed between the compost reactor bed 12 and the disinfection medium 34 or the drainage system 15 of FIGS. 1 or 2, to prevent particulate compost fragments from clogging the disinfection medium 34. The partially disinfected effluent is drained from underneath the disinfection medium 34 by the drainage system 15 and collected for pumping, gravity distribution or storage.

Alternative disinfection media 34 may be selected from gravel, charcoal, plastics particles, aggregate and such like, or combinations of these such as to maximise the wetted surface area within a given volume of medium, and yet allow oxygen to diffuse through the medium.

A hand or mechanically operated auger 39 is used to extract a sufficient quantity of stabilised compost periodically to maintain the system in a steady state continuous feed situation. The auger 39 is inserted through an extraction chute 40 leading to the base of the reactor vessel 11. After removing a ventilated extraction chute cap 41 and rotating the auger 39 into the compost a quantity of compost may be extracted.

Referring in particular to FIG. 3, the geotextile matting 38 may be used to separate the compost bed 12 from a bottom chamber 44 wherein treated liquid may be collected for removal by the drain 43 extending to a pump 45.

In practice, where soil irrigation is the proposed method of disinfection, it is believed that the wetted surface area of a single tightly spiralled coil of annular corrugated pipe from the drainage system 15 is sufficient if it covers the entire base of the vessel and extends around the lower layers of stable compost in the composting bed 12. It is preferable to cover the drainage system 15 with a plastic fabric soil sock or such like, for additional filtration and air contact surfaces.

If employed on a municipal scale, it would be possible to adapt existing treatment vessels to suit this new technology. Trickling filter beds, stabilization ponds, and other such vessels could be converted to drained composting reactor beds, with the wastewater sprayed trickled or otherwise distributed over the surface of successive layers of OMSW.

The loading of the composting reactor bed is such to achieve an even distribution of mixed organic waste substrates over the surface of the compost bed reactor and for ease of handling and rapid break-down, to comminute the OMSW, particularly wood waste and garden waste. One of the chief advances of this technology is that it requires no raking or turning.

The materials which this process can convert into a valuable soil amendment include cellulose fibre based products such as paper, cardboard and box board; natural cellulose fibre products such as cloth, contaminated dressings, facial tissues, sanitary pads, tampons and disposable nappy linings; putrescible wastes such as food wastes; garden wastes such as grass clippings, shredded prunings and leaf litter; house cleaning wastes such as dust, hair and lint; water borne organics such as faeces, sullage particulates, oil and grease; human toilet wastes; dissolved or suspended organic matter and nutrients such as soap, detergents, household chemicals and mineral salts.

Small fragments of un-plated iron, steel wool, wood ash, and charcoal are recommended and beneficial additions. Inert bulking material such as charcoal, may be added to the solids waste input to enhance internal drainage, particularly at higher wastewater loading rates. Small fragments of inert material such as plastic bottle tops, broken glass, rubber, condom latex or small pieces of plastic film will not be detrimental to the operation of the wet composting process.

Large municipal systems could be operated as batch mode systems, allowing a few months of operation without contaminated wastes being added for breakdown or maturation of the surface layers prior to bulk harvesting. If provision is made for the removal of the lower layers of the compost bed, without disturbance or mixing with the contaminated or undigested upper layers, a continuous feed plug flow type arrangement as described above could be employed. It may also be desirable to store the compost in a well ventilated dry environment for a few weeks to achieve a high quality odourless and friable compost.

Depending on the moisture content and quality of the compost, it may be desirable to store the compost in a well ventilated dry environment for a few weeks to achieve a high quality odourless and friable compost. Such an environment may be achieved within the upper portion of the compost extraction chute 40 or within a special chamber within the ventilation exhaust system in which case it would also act as an odour biofilter.

A waste treatment apparatus 10 may be installed in a new dwelling or retro-fitted into an existing dwelling. A pulsed flow of wastewater through the compost bed 12 is preferable as it allows fresh air to be drawn into the compost and exchange oxygen with the biofilm. Preferably, air pore spaces within the compost are not continuously saturated but drain to full capacity after saturation, whereby oxygen may be drawn into the pore spaces. Against this effect, the more slowly the wastewater can be fed through the compost, the more effective the filtration will be.

With a slow rate pulsed liquid flow of wastewater, it has been experimentally observed that the entire compost bed 12 remains aerobic at wastewater infiltration rates in excess of 500 l/m$^2$d. Most of the biological loading is retained near the surface where oxygen is plentiful, and sufficient dissolved oxygen remains in the wastewater to allow the aerobic purification process to continue throughout the pile.

The employment of a compost reactor bed to compost solid organic wastes and to filter out particulate solids, and biologically purify the wastewater, creates a mutually beneficial synergism between the two processes. The wastewater provides warmth, moisture and thermal stability and a carrier for bacteria, fungal spores and other microbes as well as nutrients contained within the wastewater. The compost in turn, provides a medium for physical and biological filtration which, because of the activity of the larger organisms and the physical properties of the compost or humus formed, is substantially protected from clogging despite the high organic loading of the system.

Compost has many characteristics which may make it suitable as a filtration medium, such as a high cation exchange capacity, a high surface area to volume ratio, being finely divided yet open with a renewable network of fine channels and pore spaces.

For municipal scale systems it may be preferable to use a separate disinfection vessel to ensure convenient inspection and maintenance. In an on-site domestic treatment situation, a small fan, or passive ventilation system which can draw several air changes each day through the system will provide adequate ventilation and odour control. It is desirable to draw the air from above the compost surface as any odours will then be drawn under the compost and adsorbed to a certain extent onto the compost. If worm activity is adequate there will surprisingly be very little odour emitted from the compost. This contrasts with traditional bulk compost systems which may heat up to 60° C. or more, consuming oxygen faster than it can diffuse into the middle of the pile and causing anaerobic conditions and production of unwanted odours, and the destruction of worms, beetles and such like.

With the present invention, heat is distributed more evenly through the composting bed 12 because of the high moisture content, and heat is removed from the system with the effluent. This allows the process to be maintained at a good temperature for the worms and other mesophilic composting organisms. The heat generated by the biological combustion of the organic waste material may be retained in cold climates by insulating the reaction vessel to maintain temperatures at around 35° C. I. more temperate climates, excess heat may be harvested using a heat pump. In contrast to other composting systems, the present invention operates on a substantially steady state basis with the species present within an ecological niche remaining more or less constant with respect to time.

It will of course be realised that the above has been given only by way of illustrative example of the invention and that all such modifications and variations thereto as would be apparent to persons skilled in the art are deemed to fall within the broad scope and ambit of the invention as claimed in the following claims.

I claim:

1. A method for simultaneously treating wastewater and solid organic waste within a common filter bed having a top, a bottom, and a continuum of layers of decomposing and decomposed solid organic waste, wherein a degree of decomposition of the solid organic waste in the filter bed increases from the top of the filter to the bottom, where at said bottom there is complete decomposition of said solid organic waste, said filter bed incorporating a supply of living organisms which maintain the filter bed in an air and liquid permeable condition, said method comprising the steps of:

applying wastewater and solid organic waste to the upper layer of the filter bed in such a manner so as to confine the wastewater to percolation through the filter bed;

maintaining the filter bed in an aerobic condition;

removing wastewater from the bottom of the filter bed in a substantially purified state; and removing solid organic waste from the filter bed in a decomposed state.

2. The method of claim 1, wherein the decomposed solid organic waste is periodically removed from the bottom of the filter bed.

3. The method of claim 1, further comprising the step of ceasing application of the solid organic waste material to said filter bed for a period of time sufficient to allow the solid organic waste in the top layer of the filter bed to decompose, and then batch harvesting the decomposed solid organic material from the filter bed.

4. The method of claim 1, wherein the wastewater is applied to the upper surface layer of the filter bed in a controlled flow.

5. The method of claim 1, wherein the filter bed includes an inert bulking material to assist maintaining the porosity of the filter bed.

6. The method of claim 1, further including the step of passing the purified wastewater which is removed from the bottom of the filter through a secondary filter to complete its purification.

7. The method of claim 1, wherein the wastewater to be treated has not previously been subjected to any treatment process.

8. The method of claim 1, wherein the solid organic waste to be treated is raw organic waste.

* * * * *